R. A. ROSANDER.

WRENCH.

APPLICATION FILED NOV. 4, 1919.

Reissued June 28, 1921. 15,135.

Inventor

Robert A. Rosander

By his Attorney

W. B. Morton

UNITED STATES PATENT OFFICE.

ROBERT A. ROSANDER, OF BROOKLYN, NEW YORK, ASSIGNOR TO ROMARO MACHINE AND TOOL COMPANY, A CORPORATION OF NEW YORK.

WRENCH.

15,135. Specification of Reissued Letters Patent. Reissued June 28, 1921.

Original No. 1,299,510, dated April 8, 1919, Serial No. 139,518, filed December 29, 1916. Application for reissue filed November 4, 1919. Serial No. 335,771.

*To all whom it may concern:*

Be it known that I, ROBERT A. ROSANDER, a citizen of the United States, residing in the city of New York, borough of Brooklyn, in the county of Kings and State of New York, have invented a certain new and useful Improvement in Wrenches, of which the following is a specification.

The invention relates to wrenches of the adjustable jaw type, and the object of the invention is to provide a tool of this character which shall be simple in construction, easily and quickly adjusted and reliably held, adapted to serve as an ordinary monkey wrench and as a socket wrench for engaging both hexagonal and square nuts and bolts, and also as a key wrench arranged to match the interior surfaces of hexagonal or square openings in rotatable objects thus recessed.

The invention consists in certain novel features and details of construction and arrangement by which the above objects are attained, to be hereinafter described and claimed.

The accompanying drawings form a part of this specification and show an approved form of the invention.

Similar letters of reference indicate the same parts in all the figures.

Figure 1:
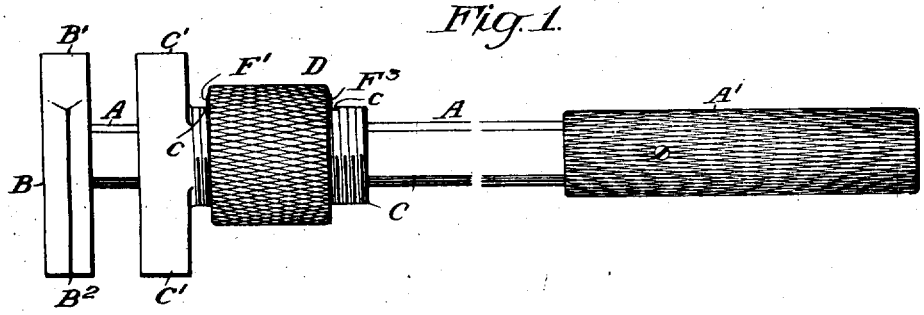
Figure 1 is a side elevation of the wrench with the jaws partially separated.
Figure 2:
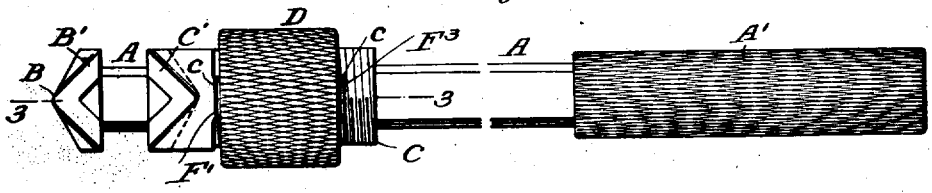
Fig. 2 is a corresponding plan view.
Figure 3:
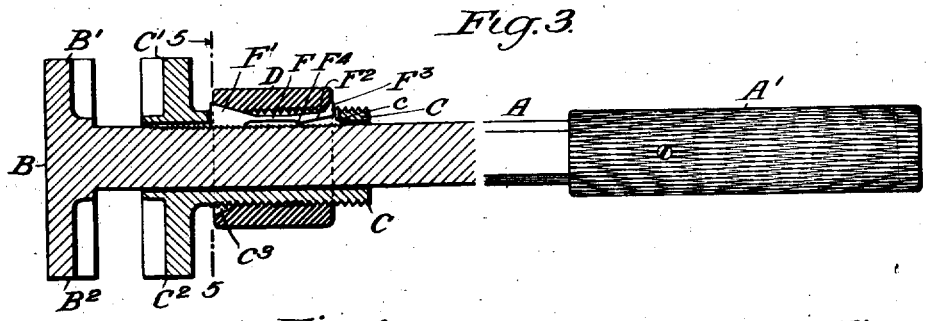
Fig. 3 is a longitudinal section taken on the line 3—3 in Fig. 2 and partly in elevation, showing the movable jaw locked in position.
Figure 4:
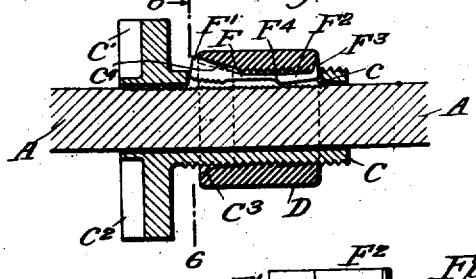
Fig. 4 is a corresponding section through the movable jaw and immediately adjacent parts, showing their relative positions when the movable jaw is freed for adjustment.
Figure 5:
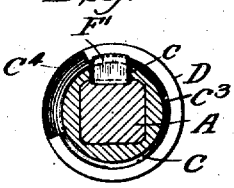
Fig. 5 is a transverse section, partly in elevation, the plan of section being indicated by the line 5—5 in Fig. 3.
Figure 6:
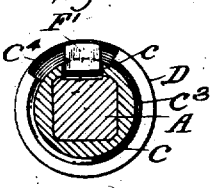
Fig. 6 is a similar view taken on the line 6—6 in Fig. 4.
Figure 7:
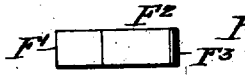
Fig. 7 is a top view of the locking dog alone.
Figure 8:
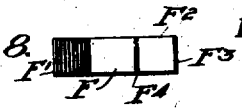
Fig. 8 is a corresponding view of the under face.

A is a bar of rectangular cross-section having rounded corners and fitted at one end to a suitable removable handle $A^1$; at the opposite end the bar terminates in a head B having oppositely projecting arms $B^1$ $B^2$ which form the fixed jaws of the wrench.

C is a tubular sleeve adapted to inclose and slide upon the bar but held against rotation relatively thereto, and having oppositely extended arms $C^1$ $C^2$ forming the movable jaws of the wrench and serving with the fixed jaws $B^1$ $B^2$. The jaws $B^1$ $C^1$ on the same side, are shaped on their adjacent faces to serve as a socket wrench in engaging a square nut or object and on their exterior faces to match to square recesses in a plug or other object to be turned, and the jaws $B^2$ $C^2$ are shaped interiorly and exteriorly to serve correspondingly with a hexagonal nut or object or in a hexagonal recess. The cylindrical exterior of the sleeve C is screw-threaded and receives a tubular cylindrical nut or follower D.

In the sleeve C is produced a longitudinal slot *c* exposing a portion of one of the plane faces of the bar A, and in the slot is a loose dog F adapted to be acted upon by the nut D and forced into strong frictional contact with such face and thus hold the sleeve C and its jaws $C^1$ $C^2$ at the desired distance from the fixed jaws $B^1$ $B^2$.

The dog has at one end an outwardly projecting head $F^1$ having an inclined outer face adapted to be acted upon by an inclined chamfer, as at $C^3$, in the forward end of the nut D so that by turning the latter in the direction to move it toward the jaws $C^1$ $C^2$ the incline of the chamfer rides upon the head $F^1$ and forces the inner face of the head strongly against the face of the bar, and a movement in the reverse direction releases the head $F^1$ and permits it to rise and disengage the bar.

Endwise movement of the dog is prevented by the slot, in which it is fitted with freedom to rise and sink but is held against lateral or longitudinal movement.

In the disengaged condition the sleeve with its jaws, together with the dog F and nut D may be slid along the bar in adjusting the jaws $C^1$ and $C^2$ relatively to the fixed jaws $B^1$ and $B^2$.

So far as yet described the operation of engaging or releasing the dog may require several complete turns of the nut thus involving labor and time which it is the main object of this invention to save by means now to be described. The chamfer $C^3$ extends only part of the circumference of the nut and terminates in a deeper or wider chamfer or segmental recess $C^4$ occupying a relatively small part of the circumference and of such shape and depth as to permit the head $F^1$ of the dog to lift freely and release the bar as soon as such recess is presented, and the recess is so located relatively to the dog that when the nut is turned back sufficiently to relieve the pressure on the dog the recess is thus presented and the dog completely and immediately released. In engaging the dog with the bar the nut is turned forward to carry the recess beyond the dog and the latter is then immediately acted upon by the narrow chamfer and forced down against the face of the bar as above described.

To insure reliable engagement of the frictional surfaces the under face of the head $F^1$ and the adjacent plane face of the bar are scored or serrated transversely to form fine teeth or corrugations adapted to interlock.

The body F of the dog is relatively thin, and the rear portion $F^2$ is inclined upwardly terminating in an outwardly projecting spur $F^3$ lying closely adjacent to the rear face of nut D, and the angle at $F^4$ on the lower face of the dog formed by the junction of the body *f* and rear portion $F^2$ serves as a fulcrum on which the dog may be tilted in the slot *c* to lift or lower the head $F^1$. Thus arranged the nut in its turning and rearward movement to present the recess $C^4$ to the dog to release the latter, engages the spur $F^3$ and tilts the dog on its fulcrum $F^4$ and automatically forces the head $F^1$ outwardly, into the recess.

In adjusting the wrench a slight turning movement of the nut D on the sleeve C in the direction to unscrew releases the dog and permits the sleeve and its connected parts to slide freely on the bar A, the corrugations on the dog being held out of contact with the corrugations on the bar by the action of the spur $F^3$, until the desired position is reached, then a slight partial revolution of the nut D in the direction to screw it on the sleeve, engages the dog with the bar and holds the sleeve and its connections firmly. It has been found that a quarter revolution of the nut is sufficient to lock or release, but by making the recess $C^4$ of considerable length relatively to the whole circumference and chamfering all of the remaining portion a considerable allowance for wear in the screw threads is afforded so that as such wear occurs it merely requires a slightly longer partial revolution of the nut to compensate therefor.

Another important advantage attained by the peculiar construction is the non-separable engagement of the nut D with the sleeve C; it will be observed that the nut lies between the head $F^1$ at one end of the dog F and the spur $F^3$ at the opposite end, and that its forward and rearward movements relatively to the sleeve are limited by these projections, so that the nut cannot be completely unscrewed and disconnected from the sleeve without first removing the bar A. This arrangement correspondingly insures against any misplacement or escape of the dog and avoids any additional holding means for the latter or for the nut.

I claim:—

1. In a tool of the character set forth, a bar having a jaw thereon, a screwthreaded sleeve slidably mounted on said bar and having a slot, a jaw on said sleeve, a dog received in said slot, and having a head thereon with an inclined outer face, and a nut engaged with said sleeve and having a circumferentially extending chamfer and a circumferentially extending recess, said chamfer adapted to coact with such inclined face when said nut is turned in one direction and force said dog into engagement with said bar to lock said sleeve to said bar, and said recess arranged to receive said head when said nut is turned in the opposite direction to free said dog from said bar.

2. In a tool of the character set forth, a bar having a jaw thereon, a screwthreaded sleeve slidably mounted on said bar and having a slot, a jaw on said sleeve, a dog received in said slot and having a head thereon with an inclined outer face, and a nut engaged with said sleeve and having a circumferentially extending chamfer and a circumferentially extending recess, said chamfer adapted to coact with such inclined face when said nut is turned in one direction and force said dog into engagement with said bar and lock said sleeve to said bar, and said recess arranged to receive said head when said nut is turned in the opposite direction to free said dog from said bar, and means on the dog whereby it may be tilted to force said head into said recess.

3. In a tool of the character set forth, a bar having a jaw thereon, a screwthreaded sleeve slidably mounted on said bar and having a slot, a jaw on said sleeve, a dog received in said slot and having a head thereon with an inclined outer face, and a nut engaged with said sleeve and having a circumferentially extending chamfer and a circumferentially extending recess, said chamfer adapted to co-act with such inclined face when said nut is turned in one direction and force said dog into engagment with said bar and lock said sleeve to said bar, and said recess arranged to receive said head when said nut is turned in the opposite direction to free said dog from said bar, and means actuated by the movement of said nut in such opposite direction for automatically tilting said dog to force said head into said recess.

4. In a tool of the character set forth, a bar having a jaw thereon, a screwthreaded sleeve slidably mounted on said bar and having a slot, a jaw on said sleeve, a dog received in said slot and having a head with an inclined outer face, and a nut engaged with said sleeve and having a circumferentially extending chamfer and a circumferentially extending recess, said chamfer adapted to co-act with such inclined face when said nut is turned in one direction and force said dog into engagement with said bar and lock said sleeve to said bar, and said recess arranged to receive said head, said dog having a spur adapted to be acted upon by said nut and tilt said dog to force said head into said recess when said nut is turned in the opposite direction.

5. In a tool of the character set forth, a bar having a jaw attached thereto, a second jaw slidably mounted on the bar, and means for locking the jaw to the bar in different positions of adjustment comprising a series of fine corrugations on one face of the bar, a dog having a complementary series of corrugations carried by said movable jaw and adjustable bodily toward and from the corrugations on the bar, and a threaded ring carried by said sliding jaw adapted to be screwed along the jaw and clamp said dog against said bar with a plurality of its corrugations in engagement with the corrugations of the bar.

6. In a tool of the character set forth, a bar having a jaw attached thereto, a second jaw slidably mounted on the bar, and means for locking the jaw to the bar in different positions of adjustment comprising a series of fine ratchet teeth on one face of the bar, a dog having a complementary series of teeth carried by said movable jaw and adjustable bodily toward and from the teeth on the bar, and a threaded ring carried by said slidable jaw adapted to be screwed along the jaw and clamp said dog against said bar with a plurality of its teeth in engagement with the teeth of the bar, said ring having an inclined surface thereon coöperating with a complementary surface on the dog.

Signed at New York city, in the county of New York and State of New York, this 4th day of September, 1919.

ROBERT A. ROSANDER.